(12) United States Patent
Heier (10) Patent No.: US 11,610,162 B2
(45) Date of Patent: Mar. 21, 2023

(54) SYSTEM AND METHOD OF WORKFORCE OPTIMIZATION

(71) Applicant: COGNYTE TECHNOLOGIES ISRAEL LTD., Herzylia Pitauch (IL)

(72) Inventor: Kurt Heier, Westminster, CO (US)

(73) Assignee: COGNYTE TECHNOLOGIES ISRAEL LTD., Herzylia Pitauch (IL)

( * ) Notice: Subject to any disclaimer, the term of this patent is extended or adjusted under 35 U.S.C. 154(b) by 0 days.

(21) Appl. No.: 17/180,440

(22) Filed: Feb. 19, 2021

(65) Prior Publication Data
US 2021/0248541 A1 Aug. 12, 2021

Related U.S. Application Data

(63) Continuation of application No. 16/903,983, filed on Jun. 17, 2020, now Pat. No. 10,949,783, which is a continuation of application No. 15/487,499, filed on Apr. 14, 2017, now Pat. No. 10,713,605, which is a continuation of application No. 14/263,403, filed on Apr. 28, 2014, now Pat. No. 9,684,881.

(60) Provisional application No. 61/839,508, filed on Jun. 26, 2013.

(51) Int. Cl.
- *G06Q 10/06* (2012.01)
- *G06F 40/131* (2020.01)
- *G06Q 10/0631* (2023.01)

(52) U.S. Cl.
CPC .... *G06Q 10/063116* (2013.01); *G06F 40/131* (2020.01); *G06Q 10/0631* (2013.01)

(58) Field of Classification Search
None
See application file for complete search history.

(56) References Cited

U.S. PATENT DOCUMENTS

| | | |
|---|---|---|
| 6,424,370 B1 | 7/2002 | Courtney |
| 6,665,423 B1 | 12/2003 | Mehrotra |
| 8,170,909 B2 | 5/2012 | Brown |
| 8,325,036 B1 | 12/2012 | Fuhr |
| 8,457,354 B1 * | 6/2013 | Kolar ............... G06V 20/52 348/169 |
| 8,532,336 B2 | 9/2013 | Bobbitt |
| 9,152,918 B1 | 10/2015 | McNair |

(Continued)

FOREIGN PATENT DOCUMENTS

CN 103136628 A * 6/2013

OTHER PUBLICATIONS

Teizer et al. "Location tracking and data visualization technology to advance construction ironworkers' education and training in safety and productivity" (Year: 2013).*

*Primary Examiner* — Sujay Koneru
(74) *Attorney, Agent, or Firm* — ISUS Intellectual Property PLLC; Anthony Jason Mirabito (57) ABSTRACT

A method of workforce optimization includes acquiring video data. The video data is obtained from a plurality of video cameras in a facility comprising a plurality of departments. A customer load for each of the plurality of departments is identified. A location of each of a plurality of employees in the facility is identified. A customer-to-employee ratio is determined for each department. The determined customer-to-employee ratio for each department is provided to a computing device. At least one employee deployment notification is provided from the computing device to another computing device.

20 Claims, 5 Drawing Sheets

(56) References Cited

U.S. PATENT DOCUMENTS

| | | | |
|---|---|---|---|
| 2002/0040313 A1 | 4/2002 | Hunter | |
| 2002/0073077 A1* | 6/2002 | Lennon | G06Q 30/06 |
| 2002/0196330 A1 | 12/2002 | Park | |
| 2003/0212589 A1 | 11/2003 | Kish | |
| 2004/0175058 A1 | 9/2004 | Jojic | |
| 2005/0004828 A1* | 1/2005 | deSilva | G06Q 10/063112 705/7.14 |
| 2005/0080658 A1* | 4/2005 | Kohn | G06Q 10/06315 705/7.14 |
| 2006/0059426 A1 | 3/2006 | Ogikubo | |
| 2006/0095331 A1 | 5/2006 | O'Malley | |
| 2006/0095539 A1* | 5/2006 | Renkis | G06T 7/246 709/217 |
| 2007/0003141 A1 | 1/2007 | Rittscher | |
| 2007/0294207 A1 | 12/2007 | Brown | |
| 2008/0033752 A1* | 2/2008 | Rodgers | G16Z 99/00 705/2 |
| 2008/0059278 A1* | 3/2008 | Medina | G06Q 10/06 705/7.14 |
| 2008/0065615 A1 | 3/2008 | Bober | |
| 2008/0144943 A1 | 6/2008 | Gokturk et al. | |
| 2008/0240572 A1 | 10/2008 | Hoshii | |
| 2008/0260255 A1 | 10/2008 | Fukushima | |
| 2008/0272920 A1 | 11/2008 | Brown | |
| 2008/0300951 A1* | 12/2008 | Kelly | G06Q 10/06311 705/7.13 |
| 2009/0219387 A1 | 9/2009 | Marman | |
| 2010/0002082 A1 | 1/2010 | Buehler | |
| 2010/0013931 A1 | 1/2010 | Golan | |
| 2010/0019905 A1 | 1/2010 | Boddie | |
| 2010/0124356 A1 | 5/2010 | Hampapur | |
| 2010/0195511 A1* | 8/2010 | Hyland | G01S 5/0036 370/252 |
| 2011/0001824 A1 | 1/2011 | Chang | |
| 2011/0002548 A1 | 1/2011 | Slvakumar | |
| 2011/0033087 A1 | 2/2011 | Finn | |
| 2011/0102634 A1 | 5/2011 | Pardue | |
| 2011/0103773 A1 | 5/2011 | Johnson | |
| 2011/0231419 A1* | 9/2011 | Papke | G06F 16/784 707/769 |
| 2011/0311100 A1 | 12/2011 | Fan | |
| 2012/0042251 A1 | 2/2012 | Rodriguez | |
| 2012/0062732 A1 | 3/2012 | Marman | |
| 2012/0075475 A1 | 3/2012 | Mariadoss | |
| 2012/0078899 A1 | 3/2012 | Fontana | |
| 2012/0092492 A1 | 4/2012 | Carbonell | |
| 2012/0117089 A1 | 5/2012 | Matrat | |
| 2012/0130774 A1 | 5/2012 | Ziv | |
| 2012/0188370 A1 | 7/2012 | Bordonaro | |
| 2012/0311497 A1 | 12/2012 | Bear | |
| 2013/0090968 A1 | 4/2013 | Borza | |
| 2013/0159203 A1* | 6/2013 | Munzer | G06Q 10/1053 705/320 |
| 2014/0009608 A1 | 1/2014 | Heier | |
| 2014/0207505 A1 | 7/2014 | Ashley | |
| 2014/0257926 A1 | 9/2014 | Rasband | |
| 2014/0278649 A1 | 9/2014 | Guerinik | |
| 2014/0333744 A1* | 11/2014 | Baym | G08B 21/245 348/77 |
| 2014/0344116 A1 | 11/2014 | Paracha | |
| 2015/0356496 A1 | 12/2015 | Bartholomew | |
| 2016/0071032 A1 | 3/2016 | Hunter | |
| 2016/0098664 A1 | 4/2016 | Yildirmaz | |
| 2017/0249417 A1 | 8/2017 | Gosieski | |
| 2022/0121884 A1* | 4/2022 | Zadeh | G06N 3/006 |

\* cited by examiner

SYSTEM AND METHOD OF WORKFORCE OPTIMIZATION

CROSS-REFERENCE TO RELATED APPLICATION

This application is a continuation of U.S. patent application Ser. No. 16/903,983, which is a continuation of U.S. patent application Ser. No. 15/487,499, which is a continuation of U.S. patent application Ser. No. 14/263,403 filed on Apr. 28, 2014, which claims the benefit of U.S. Provisional Patent Application No. 61/839,508, filed on Jun. 26, 2013. The contents of each of these applications is hereby incorporated herein by reference in their entireties.

BACKGROUND

In a retail store setting, customer interactions with customer service employees can improve the customer experience and facilitate increased sales. Current methods of customer service employee deployment within a retail facility is generally based upon management experience and generalized impressions of customer flow and customer-employee interactions within various sales departments. Therefore, these determinations are highly subjective which can result in great inefficiencies in the deployment and management of customer service employees across sales departments in a retail facility.

BRIEF DISCLOSURE

The present disclosure relates to systems and methods for identification of customers and employees within a retail facility and data driven solutions for optimization of the deployment of customer service employees within the retail facility.

An exemplary embodiment of a method of workforce optimization including acquiring video data obtained from a plurality of video cameras in a facility comprising a plurality of departments. A customer load in each of the plurality of departments is identified. A location of each of a plurality of employees in the facility is identified. A customer-to-employee ratio is determined for each department from the identified customer load and the identified location of each of the plurality of employees. The determined customer-to-employee ratio for each department is provided to a computing device associated with a manager. at least one employee deployment notification is provided from the computing device associated with the manager to a computing device associated with at least one employee.

In additional exemplary embodiment of a method of workforce optimization includes acquired, video data obtained by a plurality of cameras covering a plurality of departments in a facility. A customer load in each of the plurality of departments is identified with the computer processor from the video data. A location within the facility of each of a plurality of employees is identified with the computer processor form the video data. Employee deployment analytics are determined for each department with a computer processor from the customer load for each department and the location of each of the plurality of employees. At least one suggested employee deployment is determined with the computer processor from the employee deployment analytics and the location of each of the plurality of employees. The at least one suggested employee deployment is provided from the computer processor to a remotely located computing device.

An exemplary embodiment of a non-transient computer readable medium programed with computer readable code that upon execution by a computer processor causes the processor to optimize a workforce. The processor acquires video data obtained from a plurality of video cameras in a facility comprising a plurality of departments. The processor identifies a customer load in each of the plurality of departments from the video data. The processor further identifies a location within the facility of each of a plurality of employees from the video data. Employee data for each of the plurality of employees is acquired by the processor. Department data for each of the plurality of departments is acquired by the processor. The processor determines a customer-to-employee ratio for each department from the customer load for each department and a location of each of the plurality of employees. A plurality of suggested employee deployments is determined by the processor from the employee data, the department data, the customer-to-employee ratio, and the location of each of the employees. The computer processor provides the plurality of suggested employee deployments to a remote computing device.

DETAILED DISCLOSURE

Figure 1:
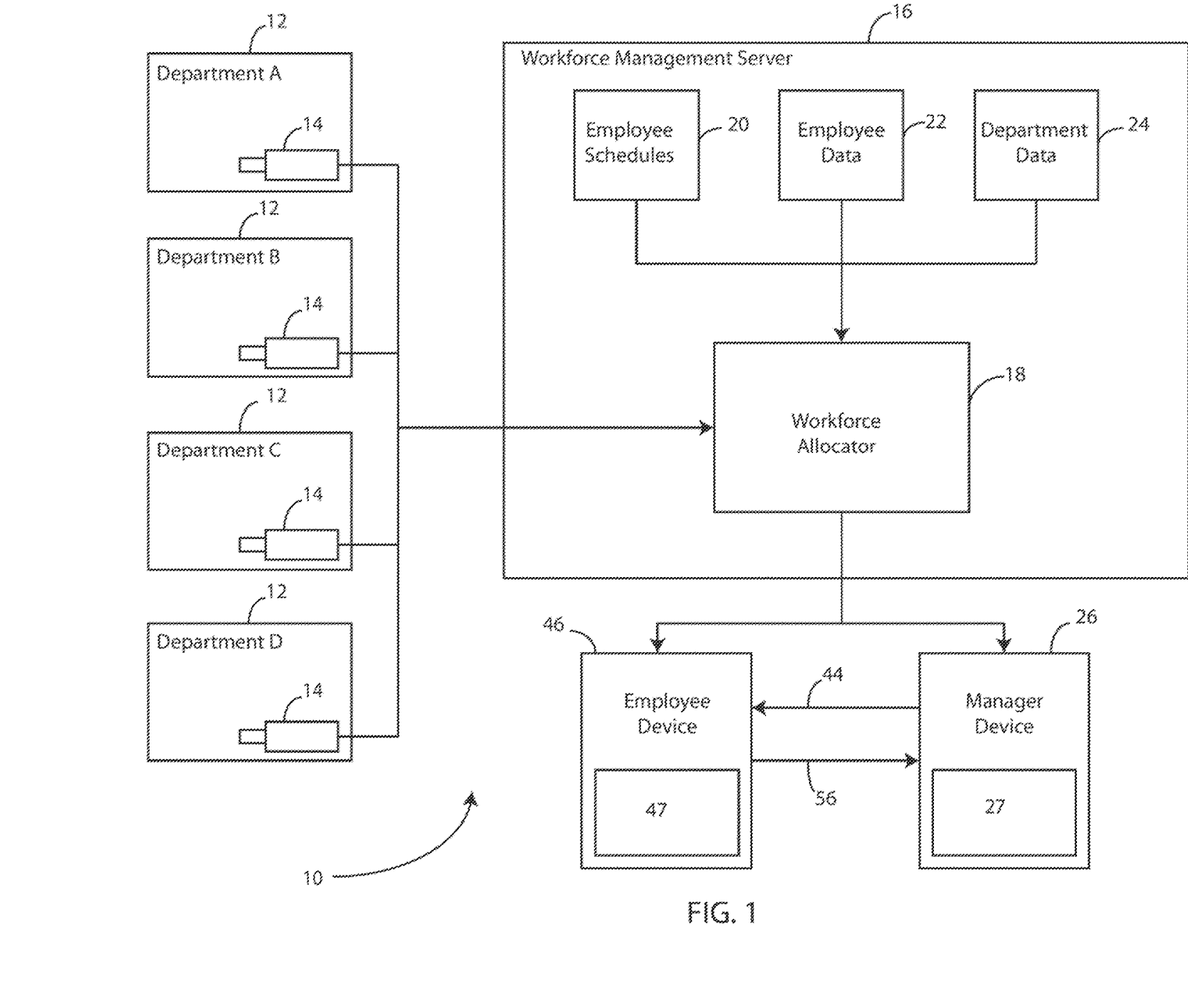
FIG. 1 is a system diagram of an exemplary embodiment of a system for workforce optimization.

FIG. 1 depicts an exemplary embodiment of a workforce management system 10 as disclosed herein. A workforce management system 10 is exemplarily configured to manage the workforce of a facility, exemplarily a retail store facility, with a plurality of departments 12, exemplarily identified as "Department A", "Department B", "Department C", and "Department D." In a merely exemplary embodiment, the departments 12 may include departments such as clothing, home goods, shoes, or jewelry in a department store, while departments such as lawn and garden, paint, tools, and building materials may be found in a home improvement store. These examples are merely exemplary of the retail settings or departments therein in which embodiments may be implemented. Each department 12 is outfitted with one or more video cameras 14 that operate as disclosed herein to obtain video data of the department 12 from which real time or near real time determinations of people counts within the department may be made. The people counts may be further refined as disclosed herein to distinguish employees, exemplarily customer service employees, from customers.

The video data is provided from the video cameras 14 to a workforce management server 16 and exemplarily to a workforce allocator 18 operating on the workforce management server 16. In an embodiment, the workforce allocator 18 processes the video data to determine the people counts from the video data, including the identification of customers and employees. In an alternative embodiment, a separate computer or computer program operating on a computer (not depicted) receives the video data, processes the video data to identify people within the video data, and categorizes the identified people as either customers or employees. In further embodiments, the video data can be analyzed to track individual customers or individual employees in movements both within a department and across departments. In still further embodiments, employees may each have an electronic device associated with the employee, which exemplarily may be an RFID tag, or a mobile computing device, exemplarily a smart phone. The electronic device is tracked by an employee tracking system to provide further employee location data that is analyzed along with the video data in order to confirm and refine the identification of employees within the video data and the locations of employees in the department or facility. In such embodiments, the verification of the locations of particular employees in the video data may allow for the identification and/or tracking of specific employees within the video data. In alternative embodiments, specific employees may be identified and/or tracked in the video data by recognition of employee physical features in the video data.

The workforce management server 16 includes a variety of sources of data that is provided to, and used by, the workforce allocator 18 as described in further detail herein. The workforce management server 16 includes employee schedules 20, employee data 22, and department data 24. The employee schedules 20 may include start, stop, and break times for individual employees, as well as a particular task to which the employee is assigned during the scheduled times. Non-limiting examples of assigned employee tasks, may include assignment of an employee to a particular department, assignment to a floating position between two or more departments, or assignment to a particular task, such as, but not limited to, product restocking or product re-facings. However, these are merely exemplary embodiments of jobs to which the employee may be assigned.

The employee data may include employee identification information, such that the employee data may be cross referenced and are associated with an employee schedule and/or an employee identification such as obtained by tracking an RFID, cell phone, or other mobile computing device associated with the employee as described above. The employee data 22 may further include an identification of the departments in which the employee has expertise, which may be identified as "primary" departments, and an identification of departments in which the employee has received at least basic knowledge or training, which may be identified as "secondary" departments.

The department data 24 may include the identification of each of the departments, an expertise used in that department, a predetermined target customer-to-employee ratio for the department, a boundary of the department, and a geographic proximity to the other departments within the facility.

The workforce allocator 18 receives the employee schedule 20, employee data 22, department data 24, and the video data from the video cameras 14 or the associated real time people counts obtained therefrom and uses this information as described in further detail herein in order to determine a departmental customer load for each of the departments 12. In an embodiment, the workforce allocator 18 further identifies a customer-to-employee ratio from the determined departmental customer load and the identified employees in the department. The customer-to-employee ratio is compared to the target customer-to-employee ratio from the department data 24 in order to determine if there is a need to reassign additional employees from other departments or tasks to a department in need of additional customer service employees.

The workforce allocator 18 is communicatively connected to a computing device 26 associated with a manager. It is to be recognized that in embodiments, the workforce allocator 18 may be communicatively connected to a plurality of computing devices 26 that may be associated with a plurality of managers, but for objective of conciseness in the description of this exemplary embodiment, a single computing device associated with a manager 26 will be described.

Figure 3:
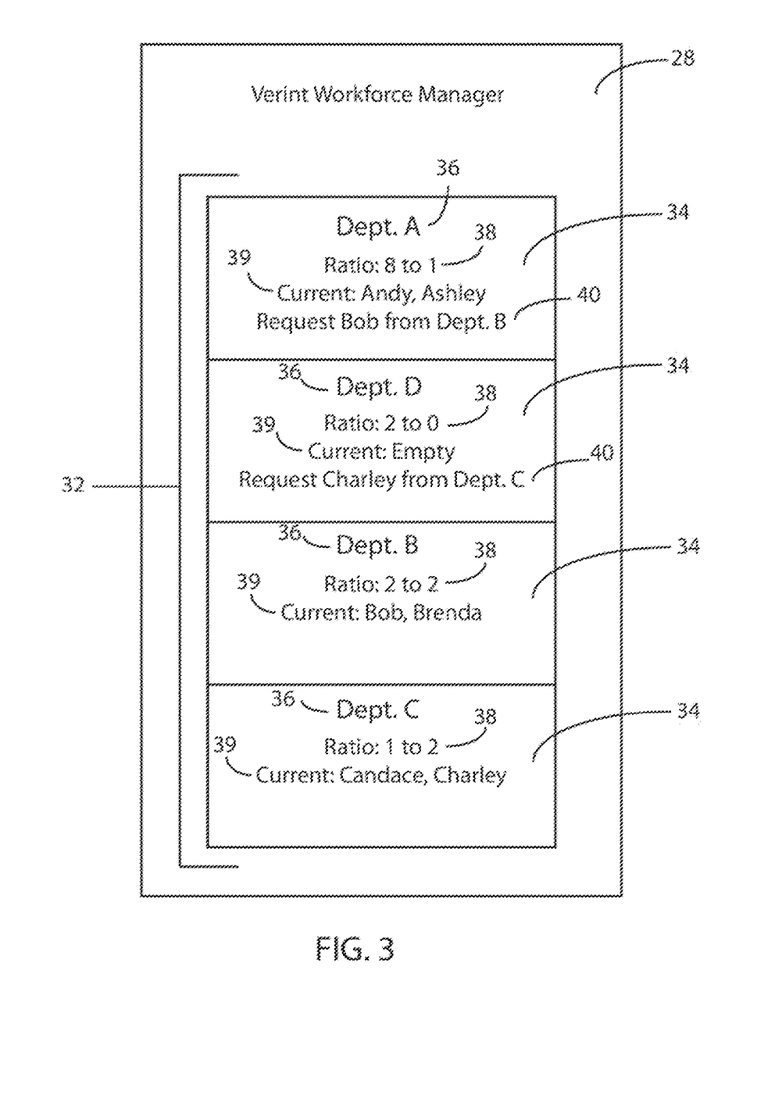
FIG. 3 depicts an exemplary screen shot from a computing device associated with a manager.
Figure 4:
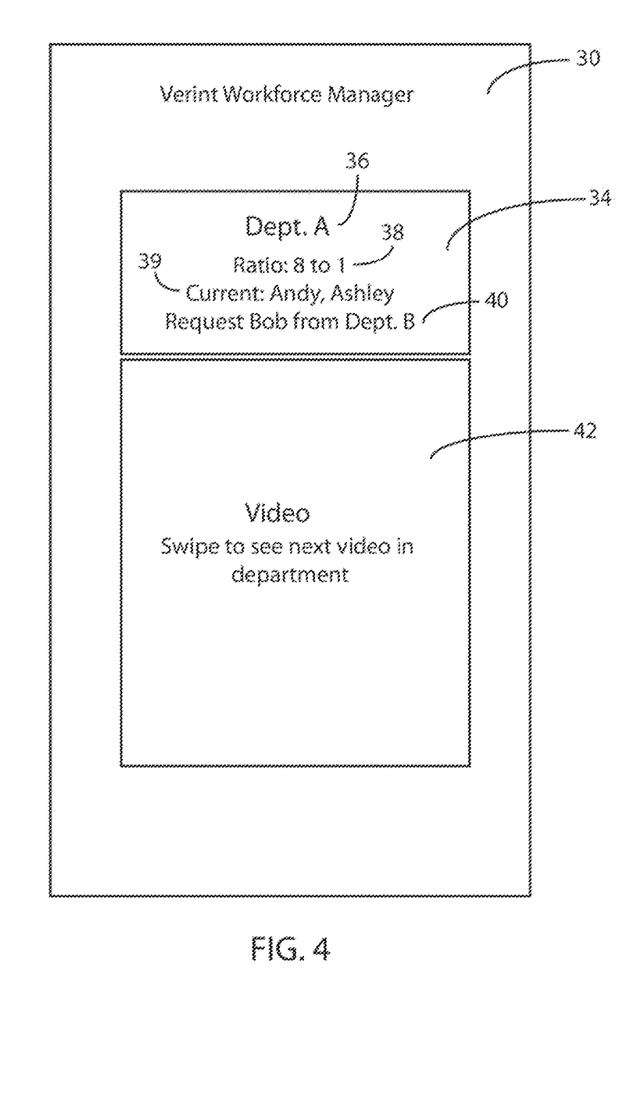
FIG. 4 depicts an alternative embodiment of an exemplary screen shot from a computing device associated with a manager.

The workforce allocator 18 may also be communicatively connected to a computing device 46 associated with an employee. Similar to the computing device 26 associated with the manager, for the sake of simplicity, only a single computing device 46 is depicted, but it is understood that in embodiments, a computing device 46 may be associated with each employee of a plurality of employees. In an embodiment, the computing device associated with the manger is a smart phone or other handheld computing device 26. FIGS. 3 and 4 depict exemplary embodiments of screen shots of a first exemplary graphical user interface (GUI) 28 and a second exemplary graphical user interface (GUI) 30 that may be presented on a graphical display 27 of the computing device 26 associated with the manager.

Referring to FIG. 3, the first GUI 28 includes an employee deployment queue 32 which includes a plurality of automatedly suggested employee deployments 34. Each suggested employee deployment 34 in the employee deployment queue 32 includes a department identification 36, a customer-to-employee ratio 38, and a suggested deployment 40. In an embodiment, the employee deployment queue 32 may list each of the suggested employee deployments 34 in descending order from most important to least important, while in an alternative embodiment, the suggested employee deployments 34 may be color coded based upon need or desirability of the suggested deployment 34. In a non-limiting example the color coding may include red for urgent suggestions, yellow for non-urgent suggestions, and green for departments with no suggested deployments.

FIG. 4 depicts an alternative embodiment of the GUI, exemplary second GUI 30. Second GUI 30 reports only a single suggested employee deployment 34, exemplarily for a most critical or urgent employee deployment. The rest of the space in the GUI 30 is devoted to a video player which may present video data from the department with the suggested deployment. Embodiments may stream real time video data of the department that coincides with the suggested deployment. This enables a manager to view the real time status of the department in the video data before initiating the suggested deployment 40.

In the second GUI embodiment 30, the manager may use a swiping motion or other navigational gesture to cycle through a plurality of suggested employee deployments 34, which include the associated real time video data of the department.

In non-limiting embodiments of the GUI in FIGS. 3 and 4, the manager may select and initiate one or more of the suggested employee deployments 34 by touching or otherwise selecting one or more of the suggested employee deployments 34. Upon this selection, the computing device associated with the manager 26 creates and sends and employee notification signal 44 to a computing device associated with the employee 46. In an alternative embodiment, the employee notification signal 44 may be routed through the workforce allocator 18 of the workforce management server 16. Similar to the computing device 26 associated with the manager, the computing device 46 associated with the employee may be any variety of computing devices, including, but not limited to a smart phone or other hand held computing device. The employee notification signal 44 may be transmitted in a variety of manners, across a variety of communication platforms, including, but not limited to Wi-Fi Bluetooth, IR, near-field communications, or other device to device communication platforms. In alternative embodiments, the employee notification signal 44 may be sent as SMS, e-mail, or internet protocol (IP) transmissions.

Figure 5:
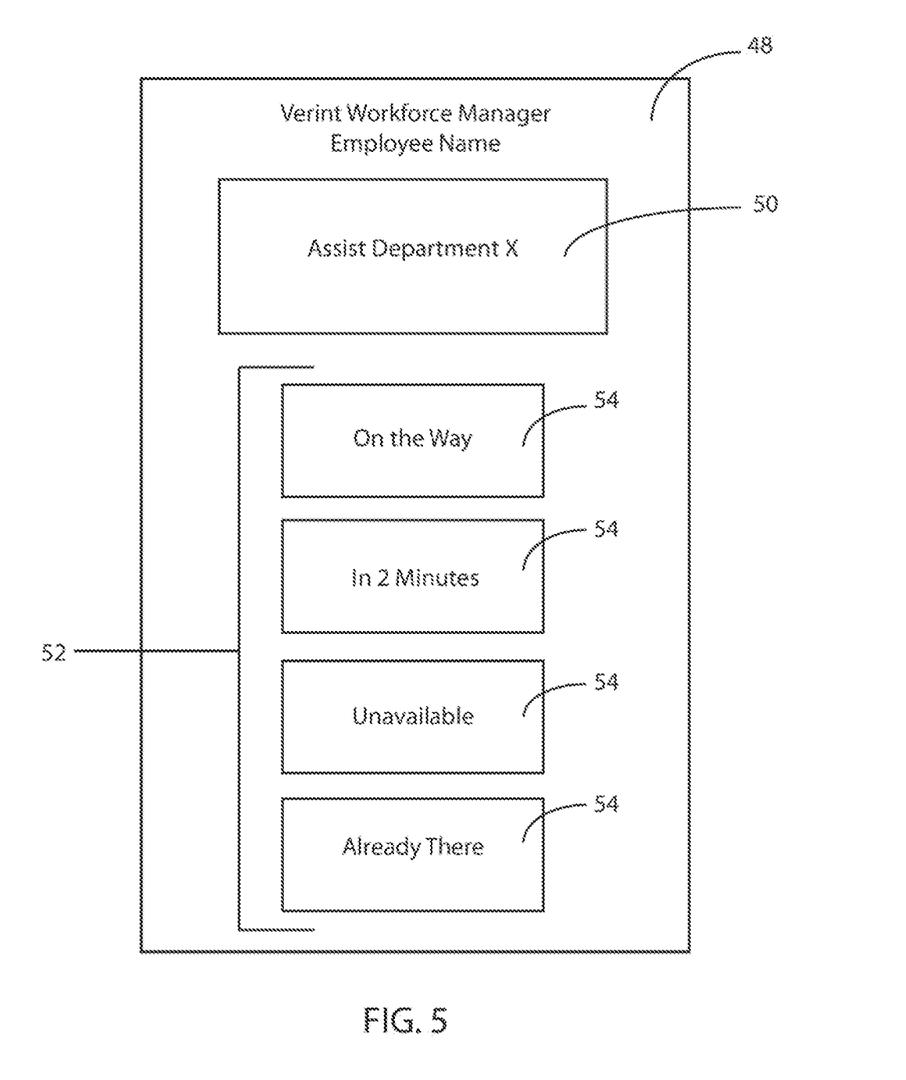
FIG. 5 depicts an exemplary screen shot from a computing device associated with a customer service employee.

FIG. 5 depicts an exemplary embodiment of the graphical user interface 38 that may be presented on a graphical display 47 of the computing device 46 associated with the employee. The GUI 48 presents an employee notification 50 associated with the received employee notification signal 44. This can inform the employee to carry out the employee deployment that was suggested by the system to the manager and approved/selected by the manager as indicated by the manager's selection of one or more of the suggested employee deployments presented at the computing device 26.

The GUI 48 provides a quick response list 52 that includes a plurality of predetermined responses 54 from which the employee may select a response to be sent back as a response signal 56 to the computing device 26 associated with the manager. It will be recognized that in an embodiment, the response signal 56 may be sent to the computing device 26 associated with the manager in the same communication format as the employee notification signal 44 is sent to the computing device 46 associated with the employee.

Upon receiving the response at the computing device 26 associated with the manager, the manager, exemplarily using a GUI as depicted in FIG. 4, may check in to the department to which the employee was deployed on the real time video display such as to confirm that the employee has acted upon the instructions and to check in on the customer service status of the department. In embodiments, it will be recognized that the workforce allocator 18 will identify and acknowledge that an employee has moved between departments 12 and update the determined departmental loads and customer-to-employee ratios in each department. In still further embodiments, it is to be recognized that the workforce allocator 18 may, upon certain determined criteria, automatedly send employee notification signals directly to one or more computing devices 36 associated with employees to enact automated employee deployments.

Figure 2:
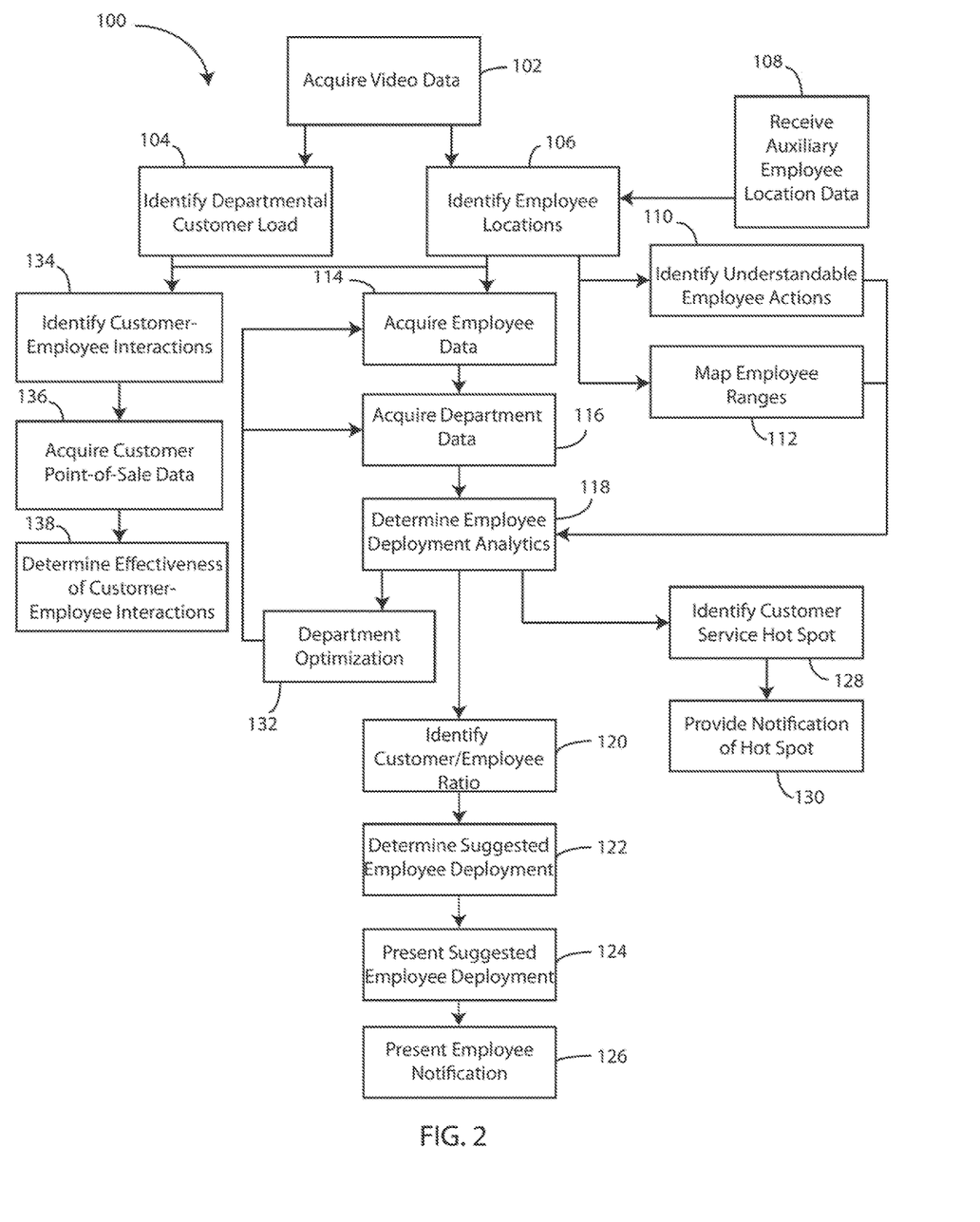
FIG. 2 is a flow chart that depicts an exemplary embodiment of a method of workforce optimization.

FIG. 2 is a flow chart that depicts an exemplary embodiment of a method 100 of workforce optimization. The method 100 begins at 102 with the acquisition of video data from a plurality of video cameras distributed throughout a facility, exemplarily a retail store. In an embodiment, the video data is acquired with respect to a plurality of departments or regions defined within the facility. The video data can be acquired and streamed in real time for real time processing in a manner as disclosed herein, while in other embodiments, the video data may be recorded in a digital format for later processing and analysis, including in the manners as described herein. However, it will be understood that the embodiments as described herein will be exemplarily described in a real-time or near-real time implementation, while it will be recognized that similar techniques may be implemented in a time-shifted implementation.

The video data acquired at 102 is processed at 104 to identify a departmental customer load and the video data is processed at 106 to identify the locations of employees within the facility. In an embodiment, this video processing may first start with analysis of the video data to identify and count people within each department based upon the video data associated with that department. In an embodiment, this raw person count may be used as the identified departmental customer load 104. In a more refined embodiment, after the video data has been processed to identify the people in the department, the person identifications are then refined to identify the employees among all of the people in the department and therefore identify at least one employee location 106. In non-limiting embodiments, employees may wear clothing or another identifiable feature that may facilitate the identification of employees within the video data. For example employees may wear a distinctive white hat or a particular color shirt. Identification of a feature such as this may indicate a high likelihood that an individual is an employee.

In an exemplary embodiment, auxiliary employee location data is received at 108 and this auxiliary employee location data is used in conjunction with the analyzed video data to refine and confirm the identified employee locations, including in some embodiments, the identification of specific employees within the department or facility. In a non-limiting embodiment, the auxiliary employee location data may be received at 108 from an RFID tag associated with the employee that is tracked or triangulated between antennas of a wireless network deployed throughout the facility. In an alternative embodiment, the employees may each carry a mobile computing device, exemplarily a smart phone or other hand held computer that includes GPS and a GPS location signal may be received at 108 as the auxiliary employee location data.

Once the departmental customer load is identified at 104 and the employee locations are identified at 106, a variety of workforce optimization techniques and analytics may be carried out, as will described in further detail herein.

In one embodiment, the identified employee location 106 may be further analyzed to identify undesirable employee actions 110 and/or to map employee ranges at 112. Undesirable employee actions identified at 110 may include identification of employee clustering which may be a sign of inefficient customer service and workforce deployment within a facility. Employee clustering may be identified as two or more employees gathered within a close proximity (e.g. maximum specified distance) to one another for a specified minimum time period. At 112, individual employees may be tracked in the acquired video data over the course of a time period exemplarily an hour, a shift, a day, or across multiple days. A map of the facility is created that shows the identified locations of the employee. This can be exemplarily depicted as a line or path that the employee traveled over the specified time period, or a heat map that integrates employee location and the length of time at that location. This can provide information as to an effective range in which an employee can provide customer service within a department. Alternatively, the mapped employee ranges may identify employees that stray or move out of an assigned department or customer service area. Any identified undesirable employee action at 110 and mapped employee ranges at 112 may be provided for later analysis and workforce optimization as disclosed in further detail herein.

At 114 employee data is acquired. The acquired employee data may include employee schedule information, which may identify employee start times, stop times, and breaks. The employee data may further include a job or task to which the employee is assigned for that day or portion of the schedule. This assigned job or task may be an assignment to a department, to a task, or to an "overflow" position. In still further embodiments, the employee data may include a employee identification such as an employee name, or identification member. The employee data may further include identification of employee skills or expertise. The identified employee skills or expertise may include an identification of one or more departments in which the employee is skilled, trained, or experienced. Such departments may be identified as "trained" or "primary" departments. The employee data further identify other departments, where the employee may also work but does not have as much training or experience. These departments may be identified as "secondary" departments. Departments in which the employee has no expertise, skill, training, or experience may be identified as "untrained" or "tertiary" departments. In a still further embodiment, each of the departments may be ranked for the employee based upon that employee's expertise, skill, training, or experience. Such ranking or other identification of employee skills may exemplarily result from routine performance reviews, a log of employee department assignments, or an online record of training courses or seminars in which the employee has participated.

At 116 department data is acquired. The acquired department data may include information such as department identification information which may identify the department, products sold therein, or the geographic boundaries of the department within the facility. The department data may further include information regarding the proximity or location of one department to other departments or within a facility. As described in further detail herein, such relative location information can facilitate determinations for optimal employee deployment. In still further embodiments, each department may have a predetermined target customer-to-employee ratio that may be used and modified as further detailed herein. This department data can be specified on a facility by facility basis, adjusted by a manager, or established on a company-wide basis. In still further embodiment, department data, exemplarily target customer-employee ratio may be automatedly determined as described herein and adjusted when new determinations are made.

Next, at 118 employee deployment analytics are determined in an embodiment. Such employee deployment analytics may be determined by the workforce allocator 18 as depicted in FIG. 1. The employee deployment analytics may be determined based upon one or more of the department customer load identified at 104, employee locations identified at 106, employee data acquired at 114, department data acquired at 116, undesirable employee actions identified at 110, and employee ranges mapped at 112. The employee deployment analytics 118 can include such determinations and aggregations based upon the received information.

In one example, based upon the identified departmental customer load and identified employee location, at 120 a customer-to-employee ratio can be identified. This identified customer-to-employee ratio can be compared to the predetermined target customer-to-employee ratio from the acquired department data to determine if more employees are required in a department or if that department is currently overstaffed and can lend an employee to a busier department.

If one department is determined to be above the predetermined target customer-to-employee ratio then at 122 a suggested employee deployment is determined. The suggested employee deployment may be determined based upon the customer-to-employee ratios determined for each of the departments in comparison to that department's predetermined target customer-to-employee ratio, the proximity of one department to another, which may relate to the time required to enact the employee deployment, and the training or skills of specific employees in each of the departments are required for the department in need of help. Still other considerations may be used, including business priorities in particular departments, sales volume of departments, sales margins of departments, or determined effectiveness of customer-employee interactions for departments. Based upon one or more of these considerations, at least one suggested employee deployment is determined at 122. These, or other, considerations may also be used to determine a priority or a relative priority for each of a plurality of suggested employee deployments.

The at least one suggested employee deployment is presented to a manger at 124 exemplarily as described above with respect to FIG. 3 or FIG. 4. In such embodiments, the manager is presented with one or more suggested employee deployments on a mobile computing device associated with the manger. The manager can review the suggested employee deployments, and in some embodiments view the real time video data of the department before selecting/confirming that one or more of the suggested employee deployments are to be carried out. Upon selection or confirmation by the manager, an employee notification is presented at 126 at a mobile computing device associated with the employee such that the employee knows to move to another department to provide customer service. As described above with respect to FIGS. 3-5, the employee may also be presented with one or more response selections, which may be sent by the employee such that the manager receives a confirmation or clarification as to when the employee will act upon the deployment notification.

The employee deployment analytics at 118 can further be used in alternative manners as well. Exemplarily, the acquired video data, identified departmental customer loads, and, in embodiments, the identified employee locations can be used at 128 to identify customer service hot spots which may be departments or portions of departments that experience a high degree of customer traffic and/or need and in which customer service needs are not met by the employees deployed to that department or area. In an exemplary embodiment, customer service need may be evaluated based upon an identified customer dwell time at a particular location without an interaction with a customer service employee. At 130 a notification of such identified customer services hot spots can be provided. In exemplary embodiments, the notification can be provided as a map, which may be a "heat map" showing customer service need, such a notification can be presented on the mobile computing device associated with the manager, or may be used by management after the fact, apart from any real time analysis. Such time-shifted or offline analysis may be used to make or inform larger management decisions regarding store layout or employee assignments.

In still other embodiments, the notification of a hot spot at 130 may be an indication of a particular department, location, or product display, if such data is available and can be cross referenced with the identified customer locations.

The employee deployment analytics determined at 118 can further be used at 132 in order to perform department optimization, which may include one or more suggestions or automated changes to the store department data previously acquired at 116. In a non-limiting embodiment, such department optimization performed at 132 may be to adjust a target customer-to-employee ratio for a particular department such as to reflect the actual need of that department or actual customer-to-employee ratios experienced within a department. In alternative embodiments, department optimization at 132 may further include adjustments to the employee schedule or other employee data acquired at 114. Such department optimizations at 132 may be to adjust the staffing or assignments of employees to particular departments, or to suggest initiating employee training such that more employees are skilled or competent to work in departments that experience high customer service needs.

In still further embodiments, the departmental customer load identified at 104 and the employee locations identified at 106, potentially in addition to the video data acquired at 102 and the auxiliary employee location data received at 108 may be used at 134 to identify specific customer-employee interactions. The identification of such specific customer-employee interactions may require further video data processing beyond the identification and counting of customers and identification of employee locations, and may further seek to pick out actual customer-employee interactions. In an embodiment, the identified interactions and the location at which these interactions occur can be translated to the products in a general vicinity of the customer-employee intonation. By tracking the customer after the customer-employee interaction through the customer check out, customer point-of-sale data can be acquired at 136 and correlated with the specific customer-employee interactions that the customer had while at the retail facility. This combined information regarding the customer purchases and the instances of customer-employee interactions can be compared at 138 to known customer conversion rates for various products and/or data acquired from customers that do not experience a customer-employee interaction with regards to specific products in order to determine an effectiveness of the customer-employee interaction identified at 134. Through such determination, a facility may be able to identify those departments or products in which the customer-employee interactions produce the largest increase in conversions or customer purchases. This information may further help to inform and drive the employee deployment decisions and suggestions, exemplarily for department optimization at 132, such that employee resources are deployed to those departments, locations, and products in which the facility may see the largest return on improved customer service.

Figure 6:
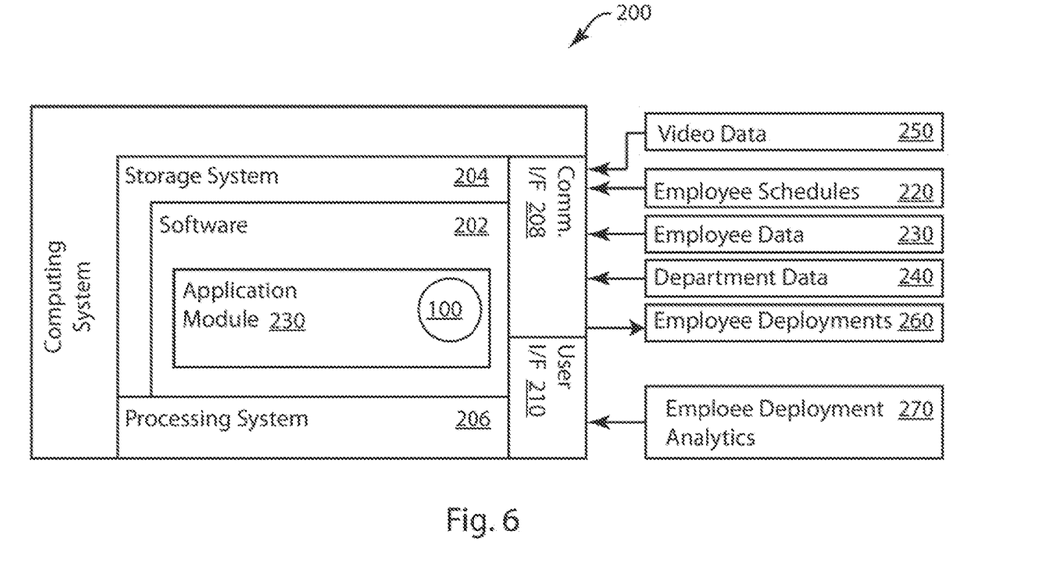
FIG. 6 is a system diagram of an exemplary embodiment of a computing system for workforce optimization.

FIG. 6 is a system diagram of an exemplary embodiment of a computing system 200 for workforce optimization. In exemplary embodiments, the computing system 200 may be used to implement embodiments of the workforce management server 16 and/or workforce allocator 18 as exemplarily described above with respect to FIG. 1. The computing system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100 as described above with respect to FIG. 2.

Although the computing system 200 as depicted in FIG. 6 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in executing program instructions. Examples of processing system 206 include general purpose central processing units, application specific processors, and logic devices, as well as any other type of processing devices, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives and transmits data through the communication interface 208. In embodiments, the communication interface 208 operates to send and/or receive data to/from other devices to which the computing system 200 is communicatively connected. In the computing system 200, video data 250 is received. The video data 250 may exemplarily come directly from a plurality of video cameras as depicted in FIG. 1, while in other embodiments the video data 250 is exemplarily stored at a computer readable medium which may be remotely located form the computing system. In a still further embodiment, the video data 250 is received by the computing system 200 from an intermediate computer (not depicted) that performs initial video processing on the video data, exemplarily to identify people in the video data or provide an initial count of people in the video data. As described above, the computing system 200 also receives employee schedules 220, employee data 230, and department data 240 which is all exemplarily stored on one or more computer readable media. The computing system 200 executes the application module 230 exemplarily to carry out an embodiment of the method 100 as described herein.

The computing system 200 processes the video data 250 in order to identify, count, and/or track people in the video data 250. The computing system further receives employee schedules 220, employee data 230, and department data 240 and uses this information along with the identified people in the video data to produce employee deployments 260 which are sent to one or more remote computing devices, exemplarily one associated with a manager. The computing system 200 also may output employee deployment analytics 270 on a graphical display or other output device. Such employee deployment analytics 270 may be used by a manager or other personnel to evaluate store operation or to adjust or modify department data 240.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of workforce optimization, the method comprising:
   acquiring video data obtained from a plurality of video cameras in a facility comprising a plurality of departments;
   analyzing the video data to identify a number of people in each department;
   searching the analyzed video data for all identified people wearing a particular distinct visually identifiable element;
   categorizing each identified person wearing the particular distinct visually identifiable element as an employee;
   identifying a location of each employee based on a location of each identified person wearing the particular distinct visually identifiable element;
   determining a current customer-to-employee ratio for each department based on the video analysis from the identified number of people in each department and the identified location of each employee;
   receiving, from a workforce management server, a target ratio of customers to employees for each department of the plurality of departments;
   identifying one or more departments that are understaffed based on a comparison, for each department, of the current customer-to-employee ratio for the department to the target ratio for the department;
   generating at least one suggested employee deployment for the one or more understaffed departments, wherein the deployment comprises moving a particular employee from another department to one of the departments identified as understaffed, wherein the at least one suggested employee deployment is based on a prioritization of which suggested employee deployment can be completed faster; and
   implementing the at least one suggested employee deployment based on the prioritization.

2. The method of claim 1, wherein the prioritization of which suggested employee deployment can be completed faster is based on the relative location of the suggested employee to the particular department.

3. The method of claim 1, the method further comprising providing a message corresponding to the at least one suggested employee deployment to a mobile computing device, wherein the mobile computing device is associated with a manager.

4. A system for workforce optimization, the system comprising:
   a plurality of video cameras positioned throughout a facility to capture video of a plurality of departments in the facility;
   one or more mobile computing devices; and
   a workforce management server in communication with the plurality of video cameras and the one or more mobile computing devices, wherein the workforce management server comprises a processor that executes software stored in memory to:
      acquire video data obtained from a plurality of video cameras in a facility comprising a plurality of departments;
      analyze the video data to identify a number of people in each department;
      search the analyzed video data for all identified people wearing a particular distinct visually identifiable element;
      categorize each identified person wearing the particular distinct visually identifiable element as an employee;
      identify a location of each employee based on a location of each identified person wearing the particular distinct visually identifiable element;
      determine a current customer-to-employee ratio for each department based on the video analysis from the identified number of people in each department and the identified location of each employee;
      receive, from a workforce management server, a target ratio of customers to employees for each department of the plurality of departments;
      identify one or more departments that are understaffed based on a comparison, for each department, of the current customer-to-employee ratio for the department to the target ration for the department;
      generate at least one suggested employee deployment for the one or more understaffed departments, wherein the deployment comprises moving a particular employee from another department to one of the departments identified as understaffed, wherein the at least one suggested employee deployment is based on a prioritization of which suggested employee deployment can be completed faster; and
      implement the at least one suggested employee deployment based on the prioritization.

5. The system of claim 4, wherein the prioritization of which suggested employee deployment can be completed faster is based on the relative location of the suggested employee to the particular department.

6. The system of claim 4, wherein the processor is further configured to provide a message corresponding to the at least one suggested employee deployment to one of the mobile computing devices, wherein the mobile computing device is associated with a manager.

7. A method of workforce optimization, the method comprising:
   acquiring analyzed video data obtained from a plurality of video cameras in a facility comprising a plurality of departments, wherein the analyzed video data includes an identification of a total number of customers in each department and an identification of a location of each employee in each department, wherein the identification of the location of each employee in each department is based on searching the analyzed video data for all identified people wearing a particular distinct visually identifiable element, categorizing each identified person wearing the particular distinct visually identifiable element as an employee, and identifying a location of each employee based on a location of each identified person wearing the particular distinct visually identifiable element;

for each department, comparing a current customer-to-employee ratio, based on the analyzed video data, to a target ratio of customers to employees for the department;

identifying one or more particular departments that are understaffed or overstaffed based on the comparing;

generating at least one suggested employee deployment for each department that is identified as being understaffed or overstaffed, wherein the deployment comprises moving a particular employee from another department to the department identified as being understaffed or overstaffed, wherein the at least one suggested employee deployment is based on a prioritization of which suggested employee deployment can be completed faster.

8. The method of claim 7, wherein each suggested employee deployment includes a department identification, the current customer-to-employee ratio, and a suggested specific employee for deployment to the department identified in the department identification.

9. The method of claim 7, the method further comprising providing a message corresponding to the at least one suggested employee deployment to a mobile computing device, wherein the mobile computing device is associated with a manager.

10. A system for workforce optimization, the system comprising:
a plurality of video cameras positioned throughout a facility to capture video of a plurality of departments in the facility; and
a workforce management server in communication with the plurality of video cameras and the one or more mobile computing devices, wherein the workforce management server comprises a processor that executes software stored in memory to:
acquire analyzed video data obtained from a plurality of video cameras in a facility comprising a plurality of departments, wherein the analyzed video data includes an identification of a total number of customers in each department and an identification of a location of each employee in each department, wherein the identification of the location of each employee in each department is based on searching the analyzed video data for all identified people wearing a particular distinct visually identifiable element, categorizing each identified person wearing the particular distinct visually identifiable element as an employee, and identifying a location of each employee based on a location of each identified person wearing the particular distinct visually identifiable element;
for each department, compare a current customer-to-employee ratio, based on the analyzed video data, to a target ratio of customers to employees for the department;
identify one or more particular departments that are understaffed or overstaffed based on the comparing, and
generate at least one suggested employee deployment for each department that is identified as being understaffed or overstaffed, wherein the deployment comprises moving a particular employee from another department to the department identified as being understaffed or overstaffed, wherein the at least one suggested employee deployment is based on a prioritization of which suggested employee deployment can be completed faster.

11. The system of claim 10, wherein each suggested employee deployment includes a department identification, the current customer-to-employee ratio, and a suggested specific employee for deployment to the department identified in the department identification.

12. The system of claim 7, the system further comprising one or more mobile computing devices, wherein the processor is further configured to provide a message corresponding to the at least one suggested employee deployment to a mobile computing device, wherein the mobile computing device is associated with a manager.

13. A method of workforce optimization, the method comprising:
acquiring video data obtained from a plurality of video cameras;
analyzing the video data to identify a number of people in each location of a plurality of locations depicted by the plurality of video cameras;
searching the analyzed video data for all identified people wearing a particular distinct visually identifiable element in each location of the plurality of locations depicted in the plurality of video cameras;
categorizing each identified person wearing the particular distinct visually identifiable element as an employee;
identifying a location of each employee based on a location of each identified person wearing the particular distinct visually identifiable element;
determining a current customer-to-employee ratio for each location based on the video analysis from the number of people in each location and the identified position of each employee;
receiving, from a workforce management server, a target ratio of customers to employees for each location of the plurality of locations;
identifying one or more particular locations that are understaffed based on a comparison, for each department, of the current customer-to-employee ratio for the location to the target ratio for the location;
analyzing the video data to identify at least one understaffed location that needs an employee redistribution, wherein the identification includes an analysis of the position of each employee to identify at least one undesired employee behavior; and
generating at least one suggested employee deployment for each location identified for employee redistribution, wherein the deployment comprising moving a particular employee from the identified location to another location, wherein the at least one suggested employee deployment is based on a prioritization of which suggested employee deployment can be completed faster.

14. The method of claim 13, wherein the undesired employee behavior is an identification of employee clustering in one of the plurality of locations.

15. The method of claim 13, further comprising, for each location, determining if the location is overstaffed based on a comparison of the current customer-to-employee ratios for the location to the target ratio.

16. The method of claim 15, wherein the locations identified for employee redistribution are locations determined to be overstaffed.

17. A system for workforce optimization, the system comprising:
a plurality of video cameras positioned throughout a facility to capture video of a plurality of departments in the facility; and
a workforce management server in communication with the plurality of video cameras and the one or more mobile computing devices, wherein the workforce management server comprises a processor that executes software stored in memory to:
acquire video data obtained from a plurality of video cameras;
analyze the video data to identify a number of people in each location of a plurality of locations depicted by the plurality of video cameras;
search the analyzed video data for all identified people wearing a particular distinct visually identifiable element in each location of the plurality of locations depicted in the plurality of video cameras;
categorize each identified person wearing the particular distinct visually identifiable element as an employee;
identify a location of each employee based on a location of each identified person wearing the particular distinct visually identifiable element;
determine a current customer-to-employee ratio for each location based on the video analysis from the number of people in each location and the identified position of each employee;
receive, from a workforce management server, a target ratio of customers to employees for each location of the plurality of locations;
identify one or more particular locations that are understaffed based on a comparison of the current customer-to-employee ratios for each location to the target ratio for each location;
analyze the video data to identify at least one understaffed location that needs an employee redistribution, wherein the identification includes an analysis of the location of each employee to identify at least one undesired employee behavior; and
generate at least one suggested employee deployment for each location identified for employee redistribution, wherein the deployment comprising moving a suggested employee from the identified location to another location, wherein the at least one suggested employee deployment is based on a prioritization of which suggested employee deployment can be completed faster.

18. The system of claim 17, wherein the undesired employee behavior is an identification of employee clustering in one of the plurality of locations.

19. The system of claim 17, wherein, for each location, the processor is further configured to determine if the location is overstaffed based on a comparison of the current customer-to-employee ratios for the location to the target ratio.

20. The system of claim 19, wherein the locations identified for employee redistribution are locations determined to be overstaffed.

* * * * *